(12) United States Patent
Rohs et al.

(10) Patent No.: US 7,077,752 B2
(45) Date of Patent: Jul. 18, 2006

(54) TORSIONAL VIBRATION DAMPER

(75) Inventors: Ulrich Rohs, Düren (DE); Hans Rohs, Düren (DE); Dietmar Heidingsfeld, Aachen (DE)

(73) Assignee: Rohs-Voigt Patentverwertungsgesellschaft mbH, Düren (DE)

( * ) Notice: Subject to any disclaimer, the term of this patent is extended or adjusted under 35 U.S.C. 154(b) by 0 days.

(21) Appl. No.: 10/738,458

(22) Filed: Dec. 16, 2003

(65) Prior Publication Data

US 2005/0014564 A1    Jan. 20, 2005

Related U.S. Application Data

(63) Continuation of application No. 09/349,264, filed on Jul. 7, 1999, now abandoned.

(30) Foreign Application Priority Data

Jul. 8, 1998    (DE) ................ 198 30 432

(51) Int. Cl.
*F16D 3/66* (2006.01)

(52) U.S. Cl. ...................... 464/67.1; 464/82

(58) Field of Classification Search .......... 464/62, 464/66, 67, 82, 83, 66.1, 67.1, 68.9, 68.92, 464/68.4, 68.41; 192/212; 74/574; 267/277, 267/287

See application file for complete search history.

(56) References Cited

U.S. PATENT DOCUMENTS

| 2,476,043 | A | 7/1949 | Hogan et al. |
| 2,993,544 | A | 7/1961 | Carlson |
| 4,148,200 | A | 4/1979 | Schallhorn et al. |
| 4,295,348 | A | 10/1981 | Helfer et al. |
| 4,304,107 | A | 12/1981 | Fall et al. |
| 4,467,905 | A | 8/1984 | Takeuchi |
| 5,064,042 | A | 11/1991 | Kühne et al. |
| 5,065,642 | A | 11/1991 | Kagiyama et al. |
| 5,377,560 | A | 1/1995 | Schierling et al. |
| 5,682,969 | A | 11/1997 | Ling |
| 5,863,253 | A | 1/1999 | Rohs et al. |
| 6,171,193 | B1 | 1/2001 | Rohs et al. |
| 6,286,390 | B1 | 9/2001 | Rohs et al. |

FOREIGN PATENT DOCUMENTS

| DE | 197 12 886 | 4/1998 | |
| EP | 0 777 059 A | 6/1997 | |
| FR | 2 495 256 | 6/1982 | |
| GB | 2 159 241 | 11/1985 | |
| GB | 2 241 560 | 9/1991 | |
| IT | 494316 | 2/1956 | ................ 464/66 |

*Primary Examiner*—Greg Binda

(74) *Attorney, Agent, or Firm*—Henry M. Feiereisen; Ursula B. Day

(57) ABSTRACT

In order to adapt the damping behavior at a wider range in a process for damping torsional vibrations and in a torsional vibration damper, the length of an elastic element can be changed in dependence on a relative angle between two rotational subassemblies, with the degree of change in length being variable in dependence on the relative angle. Furthermore, a thrust piston of a coupling element, which couples the two subassemblies, can be displaced in dependence on the relative angle, relative to a first one of the two subassemblies.

18 Claims, 9 Drawing Sheets

TORSIONAL VIBRATION DAMPER

This application is a continuation application of prior filed U.S. application Ser. No. 09/349,264, filed Jul. 7, 1999, now abandoned which claims the priority of German Patent Application Serial No. 198 30 432.3, filed Jul. 8, 1998.

BACKGROUND OF THE INVENTION

The invention relates, on the one hand, to a process for damping torsional vibrations in which two subassemblies are rotatable relative to one another and interact with one another via at least one essentially tangentially effective elastic element, so that the length of the elastic element is changed in dependence on a relative angle between the two rotational subassemblies. On the other hand, the invention relates to a process for damping torsional vibrations in which two subassemblies are rotatable relative to one another and interact with one another via at least one elastic element so that the elastic element is compressed in dependence on a relative angle between the two rotational subassemblies. Furthermore, the invention relates to a process for damping torsional vibrations in which two subassemblies are rotatable relative to one another and coupled to one another by at least one coupling element, which opposes a relative movement of both subassemblies. Also, the invention relates to a respective torsional vibration damper.

This type of process and such a torsional vibration damper are known, for example, from EP 0 777 059 A2. This publication discloses a torsional vibration damper comprised of a rotating drive disk, and a coaxial driven disk, which rotates in a same direction, with means for elastic force transmission. In order to simply and cost effectively design such a torsional vibration damper and to facilitate the neutralization of vibration in all load ranges of a drive, including the idle range, the drive disk should partly overlap the driven disk and have radial slots which are spaced about the inner circumference of the overlapping part and have ends which are slightly wedge-shaped. The cross-section of the drive disk has a polygonal outer surface area. Pairs of wedge-shaped thrust pistons are arranged in the slots and forced apart by at least one compression spring, whereby the thrust pistons are flat or slightly curved on their sides opposing the outer surface area of the drive disk. When the two rotational subassemblies are rotated at a relative angle, the compression spring, as an elastic element, is extended in length in dependence on the relative angle between the two rotational subassemblies. Thus, the coupling configuration of thrust pistons and compression spring opposes a relative movement of the two rotational subassemblies.

SUMMARY OF THE INVENTION

It is an object of the invention, to provide damping processes and a torsional vibration damper of this type with a wider range in the adaptation of damping behavior.

In accordance with the invention, a solution involves, on the one hand, the provision of a process for damping torsional vibrations in which two subassemblies, which rotate relative to one another, interact with one another via at least one essentially tangentially effective elastic element, so that the length of the elastic element in dependence on a relative angle between the two rotational subassemblies is changed, and in which the degree of change in length can be varied in dependence on the relative angle.

In accordance with the invention, a solution involves, on the other hand, the provision of a process for damping torsional vibrations in which two subassemblies, which rotate relative to one another, interact with one another via at least one elastic element, so that the elastic element is compressed in dependence on a relative angle, and in which the degree of compression can be varied in dependence on the relative angle.

When torsional vibrations are damped using the process according to the invention, by varying the degree of change in length or degree of compression in dependence on the relative angle, the damping performance is no longer exclusively characterized by the elastic properties of the elastic element. Rather, the damping behavior can be adjusted by adapting the variation of the degree of change in length or degree of compression, despite given elastic elements. Such a process is particularly suitable when springs and spring-like arrangements are used as elastic elements.

Advantageously, the degree of change in length, and the degree of compression, respectively, is selected low, preferably almost equal to zero, at low relative angles starting from an idle position. In this way, the elastic element is only subjected to a marginal change in length or compression at low relative angles, so that a low torsional rigidity is realized, which is particularly desirable during idling of motor vehicles.

In addition, the degree of change in length, and the degree of compression, respectively, can increase as the relative angle increases. Thus, the spring constant increasing with the relative angle of the elastic element is effectively simulated, so that the elastic element reacts "firmer" at greater relative angles than at smaller relative angles.

Furthermore, the invention suggests a process for damping torsional vibrations in which two subassemblies rotate relative to one another and are coupled via at least one coupling element which opposes a relative movement of the two rotational subassemblies, whereby at least one thrust piston of the coupling element is displaced in dependence on a relative angle between the two subassemblies relative to a first one of the two subassemblies, while at the same time acting on the first subassembly with a restoring force.

Another solution suggested is a torsional vibration damper, in which two subassemblies rotate relative to one another and are coupled via at least one coupling element, which opposes a relative movement of the two rotational subassemblies, and in which the coupling element includes at least one thrust piston, which is so guided as to be displaced relative to the first subassembly in dependence on a relative angle between the two subassemblies while acting on the first subassembly with a restoring force.

Upon coupling of the two rotational subassemblies, which coupling is characterized conventionally by a relative angle between the two subassemblies, this relative angle is superimposed, in accordance with the invention, by the displacement of the thrust piston. The damping behavior is thereby characterized according to the invention by the relative angle between the two subassemblies as well as by the displacement of the thrust piston in relation to the first subassembly. In this way, it is possible to influence the damping behavior more precisely through adjustment of the displacement of the thrust piston in relation to the first subassembly, compared to conventional processes and apparatuses. The displacement of the thrust piston with respect to the first subassembly in dependence on the relative angle between the two opposing rotational subassemblies corresponds to a translation of the movement of the first subassembly into the movement of the thrust piston. The translation is then determined in dependence on the actual displacement at a particular relative angle.

Any element of a torsional vibration dampers, which is part of a coupling between two subassemblies rotatable relative to one another and displaceable in dependence on the relative angle, can be used as thrust piston. The advantage associated with the invention is in particular evident when the displacement of the thrust piston is exploited to vary the degree of change in length of an elastic element, in particular a spring element.

The advantages associated with the invention can be applied furthermore when the thrust piston contributes to the friction. Due to its displacement in relation to the first subassembly a frictional force between the thrust piston and the remaining subassemblies of the torsional vibration damper can be influenced as desired.

On the one hand, the thrust piston can be tilted in a particular relative angle range in dependence on the relative angle in relation to the second subassembly. Hereby, the thrust piston in relation to its guidance may have at least one idle position and one displacement position, whereby in its idle position it rests against a contact area of the second subassembly, and its displacement position is tilted relative to the idle position. During this tilting, the movement of the first subassembly is translated into a movement of the thrust piston, so that the first subassembly can rotate more freely, since the thrust piston of the coupling element essentially remains stationary during tilting. Since the coupling element opposes a relative movement of the two subassemblies, a restoring moment is transmitted via the coupling element and the thrust piston, respectively, even at very small relative angles between the two subassemblies. However, only very low frictional losses occur during tilting, so that during the transition from idle position to displacement position almost no frictional force is generated. This ensures a very good disengagement at low loads, especially during idling of motor vehicles.

A simple embodiment of the invention is realized when the thrust piston is shifted along the first subassembly at least in a particular relative angle range in dependence on the relative angle. This is effected advantageously along a surface area of the first subassembly. This surface area can be essentially aligned in circumferential direction. Advantageously, the displacement movement is realized along a plane surface of the first subassembly. When there are several coupling elements, such plane surfaces can be realized by a polygonal surface area of the first subassembly.

Such a displacement ensures, on the one hand, by way of a simple construction a displacement of the thrust piston in relation to the first subassembly. Furthermore this displacement enables also a control of the frictional behavior of the thrust piston in its guidance, in which a surface angle between the thrust piston and its guidance can be influenced as desired. Such influence of the surface angle is especially possible when the displacement is effected along a plane surface of the first subassembly, since it is only necessary to provide a suitable complementary guide, such as, for example, a guide surface of the second subassembly, for effecting a respective angle.

Due to the high rotational speeds and further loads which can act especially in axial direction of the torsional vibration damper, it may happen that an elastic element provided between two thrust pistons of the coupling element strikes against one of the two rotating subassemblies. This can be avoided by overlapping the thrust pistons at a particular relative angle, when the two thrust pistons are moved toward one another at a particular relative movement of both subassemblies.

In this context, the term "overlap" refers to a situation in which parts of the thrust pistons have a same angular position in relation to the main rotational axis of the torsional vibration damper. By such an overlap, the guide length of the thrust pistons for the elastic element or a spring element located between the thrust pistons can be advantageously extended, so that the danger of striking can be reduced.

In this context, the term "particular" means that also other conditions are possible, such as relative movements and relative angle, and should correspond to at least one of these conditions of the above-stated definitions.

A prolongation of the guide can be ensured by providing both thrust pistons with a lateral support surface for the spring element located between the thrust pistons and engaging in a corresponding recess of the respectively other thrust piston. Also, both thrust pistons can have an external support surface for the spring element located between the thrust pistons and having an axially external region provided with a slanted ramp surface. The recess and the slanted ramp surface, respectively, permit an overlap of both thrust pistons so that overall a considerably larger support surface is ensured.

The above described features, in particular the overlap of both thrust pistons further enable a substantially greater rotational angle of the torsional vibration damper before the two thrust pistons strike each other.

A guide surface for attachment to one of the rotational subassemblies may be provided in axial direction adjacent to the slanted ramp surface. This guide surface ensures that each thrust piston is sufficiently guided between the two rotational subassemblies, despite an interlocking engagement of the thrust pistons.

Interlocking engagement of both thrust pistons and overlap of both thrust pistons can be realized, for example, by providing both thrust pistons, at least with respect to one of the two rotational subassemblies, with a receiving position and an engagement position. Hereby, the term "receiving position" denotes a position of a thrust piston in which the other thrust piston can engage therein. Correspondingly, the term "engagement position" denotes a position of the thrust piston in which it can engage the opposite thrust piston which occupies the receiving position.

For example, the receiving position may essentially correspond to the previously described idle position, while one thrust piston in its displacement position may pass also the engagement position when the two rotational subassemblies rotate in opposition to one other.

In particular, each thrust piston may be tilted radially inwards in its engagement position in relation to the other thrust piston. Preferably, the slanted ramp surface of the one thrust piston engages in the engagement position underneath the slanted ramp surface of the second thrust piston.

A secure guidance of the thrust piston in its engagement position can be ensured by forced movement thereof in its engagement position through both rotational subassemblies.

On the other hand, means may be provided which secure one of the thrust pistons in its receiving position, when the second thrust piston occupies its engagement position. This can, for example, be realized by the spring elements of the coupling element itself. On the other hand, limiting means may be provided which, at least at beginning engagement of one of the two thrust pistons in the second one of the two thrust pistons, form a stop which prevents an exiting of the receiving position of the second one of the two thrust pistons. Preferably, the stop leaves a certain clearance for the second one of the two thrust pistons, so that this stop does not substantially interfere with the free movement of the torsional vibration damper. On the other hand, the stop effectively prevents a premature impacting of the two thrust pistons.

The assembly costs for such a torsional vibration damper according to the invention can be reduced if the coupling element has two essentially identical thrust pistons in opposition to one other. This is particularly true for the thrust pistons according to the invention which overlap one another.

This can be ensured in particular by configuring the thrust pistons in relation to a radial plane of the torsional vibration damper asymmetrically, with the asymmetry so selected that the two thrust pistons oppose one another and interlock one another.

Needless to say, that a torsional vibration damper with thrust pistons capable of overlapping each other is advantageous, regardless of the other features of the torsional vibration damper. The same is true for any combinations of features set forth in this context or for each of the feature mentioned in this context.

Further advantages, objectives and features of the present invention will now be described with reference to the attached drawing in which an exemplified torsional vibration damper according to the invention as well as a damping process according to the invention are illustrated. The drawing shows in:

DETAILED DESCRIPTION OF PREFERRED EMBODIMENTS

Figure 1:
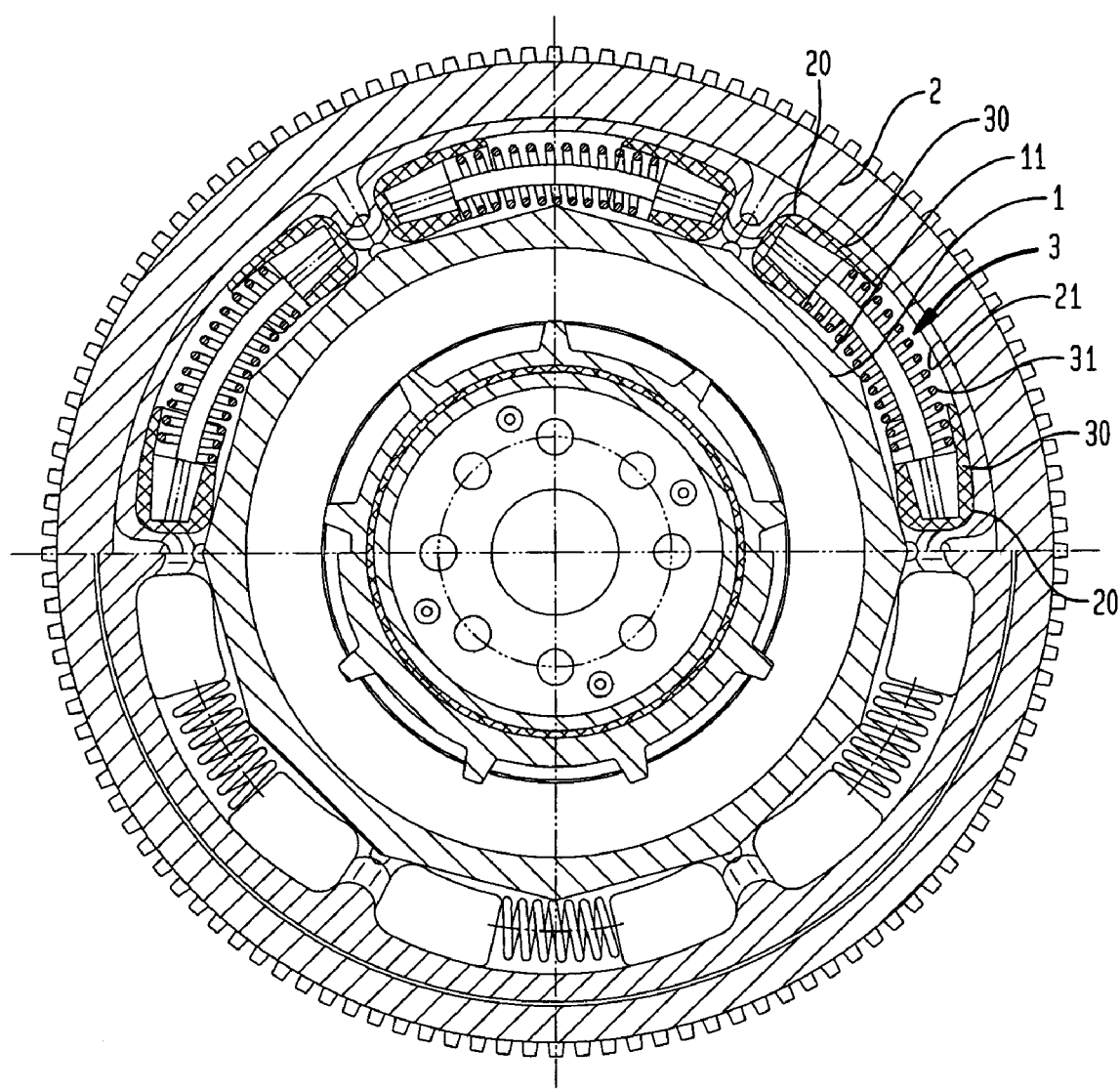
FIG. 1 a section of a torsional vibration damper.
Figure 2A:
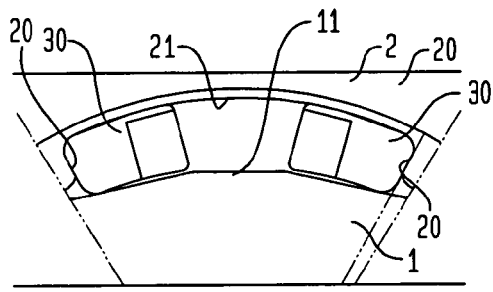
FIGS. 2a–j is a schematic illustration of a progressive relative movement between two subassemblies of the torsional vibration damper according to FIG. 1 showing one of the pistons being displaced in the direction of the other piston.
Figure 2B:
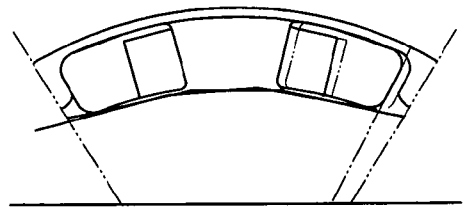
Figure 2C:
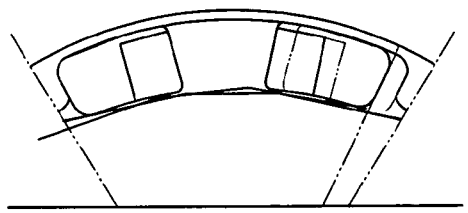
Figure 2D:
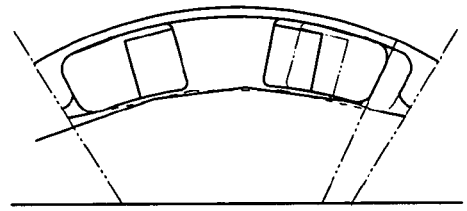
Figure 2E:
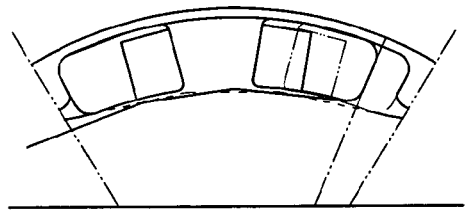
Figure 2F:
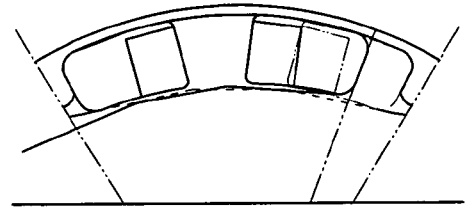
Figure 2G:
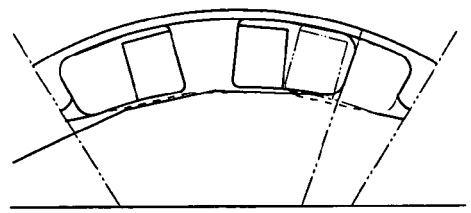
Figure 2H:
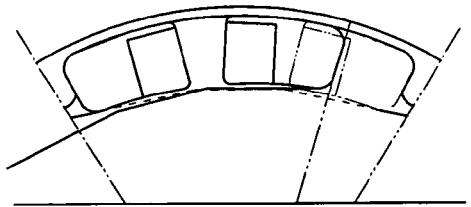
Figure 2I:
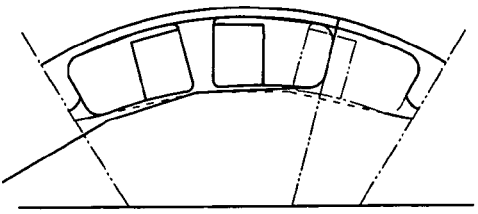
Figure 2J:
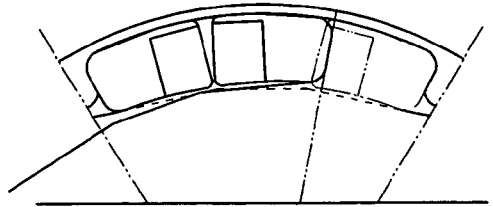

The torsional vibration damper depicted in the figures has two subassemblies 1 and 2 which rotate relative to one another and are coupled together by six coupling elements 3. Each of the coupling elements 3 includes spring elements 31 by which thrust pistons 30 are urged against a contact area 20 of the second subassembly (the multiplicity of subassemblies are indicated by reference numerals only by way of example).

The contact areas 20 are each part of a guide for the thrust piston 30, with the guide being formed by a guide surface 21 of the second subassembly 2 and essentially a plane guide surface 11 of the first subassembly 1.

The movement of the thrust piston 30 determined by the guide in dependence on a relative angle between the two subassemblies 1 and 2 is shown in FIGS. 2a–j and 3. During a relative rotation between the two subassemblies 1 and 2, one of the two thrust pistons 30 of each coupling element 3 is displaced, whereby the displaced thrust piston 30 at a same time acts with a restoring force upon the first subassembly 1. Meanwhile, the other thrust piston 30 remains at the contact area 20 of the second subassembly. The relative movement between the two subassemblies 1 and 2 not only leads to a displacement of the thrust piston 30 in relation to the second subassembly, but also to a relative movement between the thrust piston 30 and the first subassembly 1, as can be seen in FIGS. 2a–j and 3. Hereby, the thrust piston 30 executes, on the one hand, a tilting motion from its idle position to a displacement position, and, on the other hand, is displaced along the guide surface 11 of the first subassembly 1.

Figure 3:
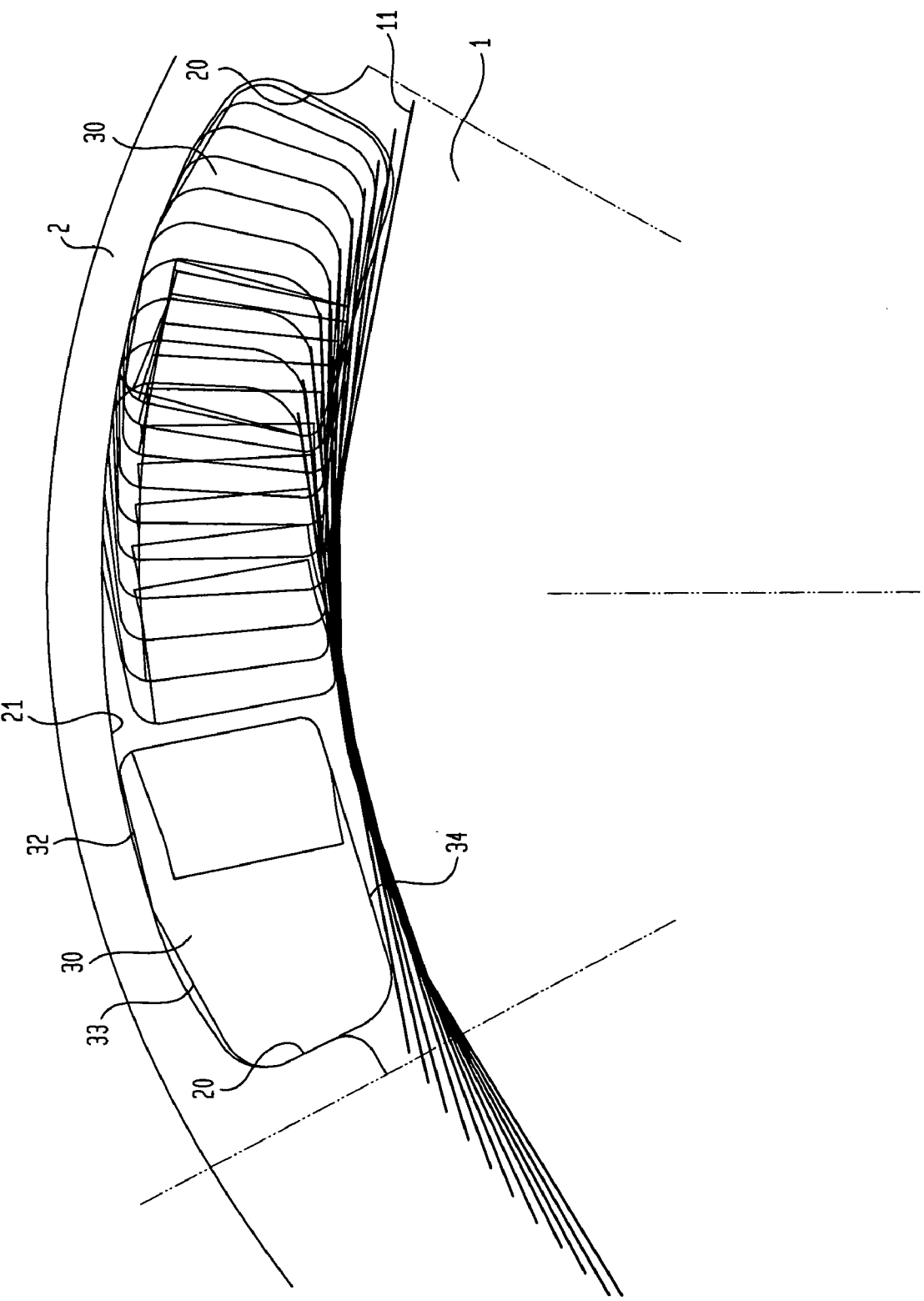
FIG. 3 a superimposed illustration of the movement pattern according to FIG. 2.

FIG. 3 illustrates the progression of the piston 30 in FIGS. 2a–2j. The right piston 30 was resting against the contact area 20 of the second subassembly. The guide surface 11 of the first subassembly is shown as multiple black lines indicating eleven snapshots over time as the right piston is moved along the guide surface 11. As the piston 30 progresses to the left, each black line shows at the right hand end a progressively shorter distance of the guide surface 11 relative to the piston indicating that at that stage, the first subassembly moves faster than the piston; that is, it moves underneath the piston resulting in a ration of translation of the movement of the first subassembly into the piston movement of less than 1. At a certain point during the relative rotation between the two subassemblies, the guide surface 11 and the surface 21 of the second subassembly form a confining guide path for the piston, so that the piston 30 is forced to move faster than the first subassembly while progressing toward the idle piston, thus resulting in a ratio of translation of first subassembly movement to piston movement of greater than 1.

In idle position (see, for example, the left hand thrust piston in FIG. 3), the thrust piston 30 bears upon the contact area 20, on the one hand, and bears with a first thrust piston guide surface 32 on the guide surface 21 of the second subassembly, on the other hand, while only slightly touching the first subassembly 1 on its guide surface 11. In the displacement position, on the other hand, the thrust piston bears with a second guide surface 33 upon the guide surface 21 of the second subassembly, while bearing with its bottom side 34 upon the guide surface 11 of the first subassembly. The guide surfaces 33 and 34 of the thrust piston 30 are aligned in opposition to one another in a wedge-shaped fashion.

In the event, both subassemblies 1 and 2 are moved relative to one another, the first subassembly 1 presses with its guide surface 11 one of the two thrust pistons 30 of each coupling element 3 from its idle position into the displacement position. During this tilting motion, the first subassembly 1 slides underneath the thrust piston. At the same time, a slight change in length and compression of the spring element 31 is realized, so that the thrust piston 30 applies a restoring force onto the first subassembly. The frictional forces encountered during this tilting motion are, however, extremely slight, so that in this context, during tilting motion almost no friction is present.

Figure 4:
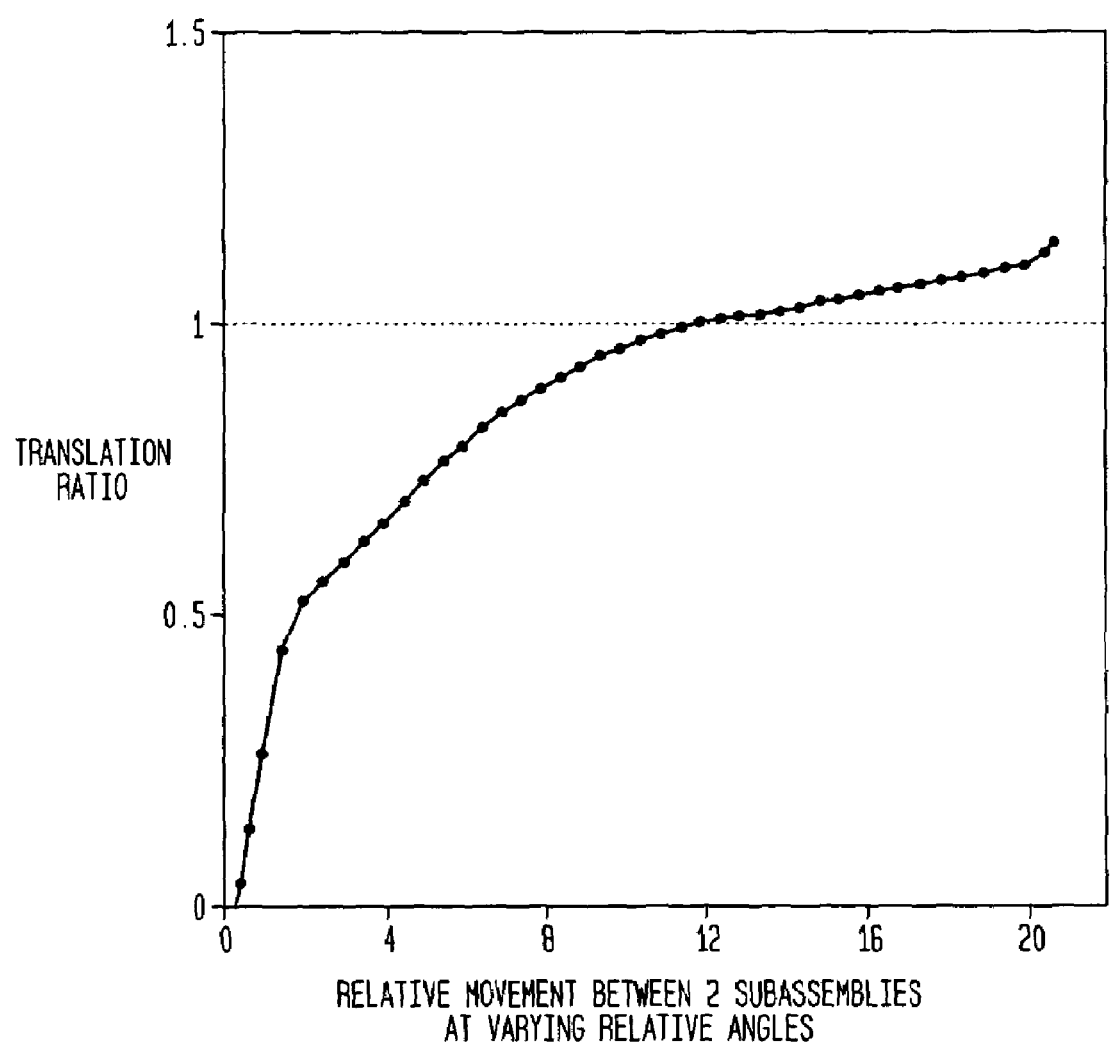
FIG. 4 the transmission between the first subassembly and thrust piston in dependence on the relative angle.

As the first subassembly 1 slides underneath the thrust piston 30, a translation is realized between the rotational movement of the piston 30 about a main rotational axis of the torsional vibration damper and the rotational movement of the first subassembly 1 about this main rotational axis, that is, the thrust piston rotates slower than the first subassembly, resulting in a translation of rotational movement which is almost equal to zero (see FIG. 4).

At slightly greater relative angles, the guide surfaces 33 and 34 of the thrust piston 30 bear upon the respective guide surfaces 21 of the second subassembly 2 and 11 of the first subassembly 1. Hereby, the guide surface 21 is so designed that the thrust piston 30 initially rotates slower than the first subassembly 1, so that the thrust piston 30 is moved away relative to the first subassembly 1 from the spring element 31. This effects a translation which is smaller than 1 (see FIG. 4).

From a relative angle of approximately 12°, the guide surface 21 of the second subassembly 2 is designed such that the thrust piston 30 rotates faster than the subassembly 1. This means that the thrust piston 30 in relation to the first subassembly 1 moves towards the spring arrangement 31. As a consequence of this relative movement of the thrust piston 30 in relation to the first subassembly 1, a translation greater than 1:1 is effected.

With regard to the spring element 31, the translation depicted in FIG. 4 means that the spring constant at translation values of less than 1 are virtually decreased, and spring constant with a ratio greater than 1 are virtually increased. Further, the frictional behavior of this arrangement can be influenced through appropriate selection of the pitch of the guide surfaces 32, 33 and 34, as well as 11 and 21.

Depending on requirements, this arrangement can be configured asymmetrically so that the translations of the right hand thrust piston 30 and the left hand thrust piston 30 differ. It is also possible to omit one of the thrust pistons 30 altogether.

Through the relative movement of the thrust piston 30 with respect to the first subassembly 1, a variation of the degree of change in length, or degree of compression of the spring element 31, is realized in dependence on the relative angle. At lower relative angles, the degree of change in length is virtually equal to zero, while also increasing with rising relative angle.

Figure 5:
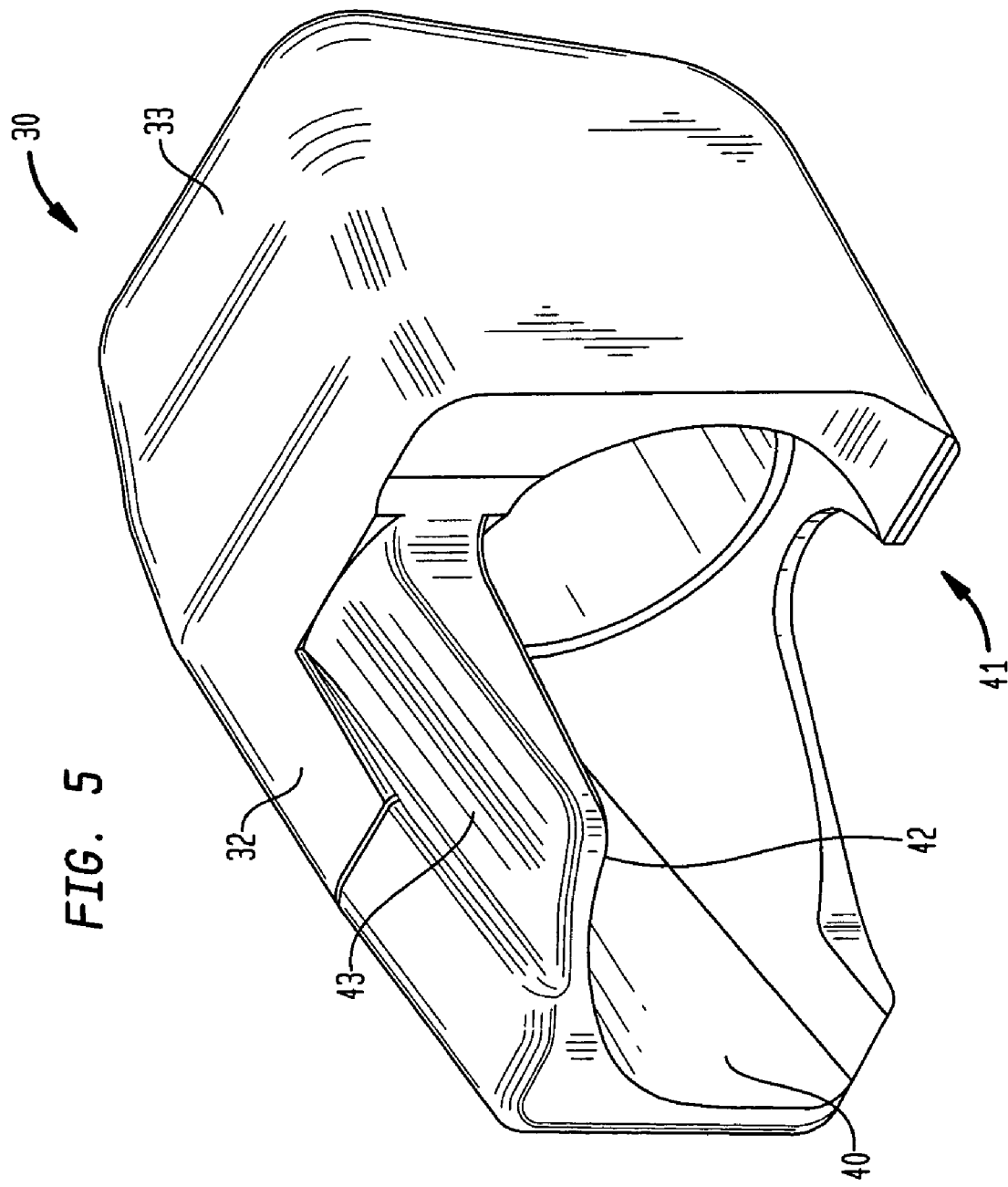
FIG. 5 a perspective view of a preferred thrust piston.

The preferred thrust piston 30, depicted in FIG. 5, has a lateral support surface 40, which can guide the corresponding spring element 31 according to FIG. 1. Likewise, the thrust piston 30 has an external support surface 42 with an axial, external area forming a slanted ramp surface 43.

Provided axially adjacent to the slanted ramp surface 43 is a guide surface 32. As depicted in FIGS. 6 to 10, this guide surface 32 can bear upon the rotational subassembly 2.

In addition, the thrust piston 30 according to FIG. 5 has a recess 41, in which the lateral support surface 40 of the opposing, identical thrust piston 30 can engage.

As can be seen, the thrust piston 30 is designed asymmetrically in relation to a radial plane of the torsional vibration damper, with this radial plane being used, for example, as a plane of projection in FIGS. 6 to 10. In accordance with FIG. 1, this radial plane extends through springs 31.

As depicted in FIGS. 6 to 10, the two identical thrust pistons 30 according to FIG. 5 are arranged in opposition to one another and form together with a spring element, not shown in FIGS. 6 to 10, the respective coupling element. Hereby, as clearly shown, the lateral support surface 40 of the one thrust piston 30 lies below the plane of projection, and the lateral support surface 40 of the other thrust piston 30 lies above the plane of projection.

If the two rotational subassemblies 1, 2 are moved relative to one another, one of the two thrust pistons 30 (in the exemplified embodiment of FIGS. 6 to 10, the left hand thrust piston) moves, as described above and depicted again in FIG. 7, in its displacement position, while the other thrust piston 30 (in the exemplified embodiment of FIGS. 6 to 10, the right hand thrust piston) remains in its idle position.

Figure 6:
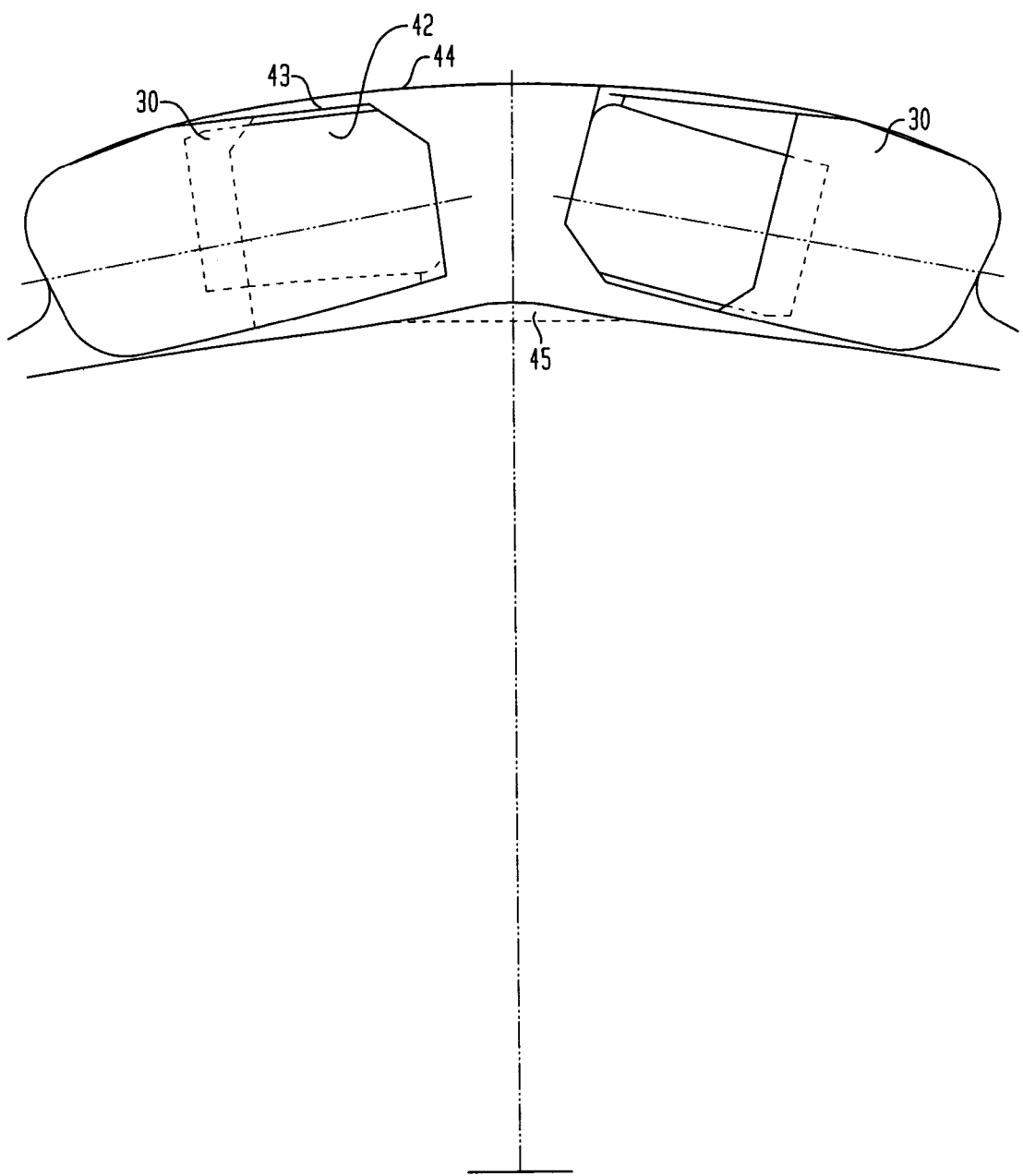
FIG. 6 is a schematic illustration of a relative movement between two subassemblies of the torsional vibration damper with the two thrust pistons according to FIG. 5 in an idle position.

As especially shown in FIGS. 7 to 10, the left hand thrust piston 30 is tilted in relation to the right hand thrust piston 30 radially inwards. At the same time, the spring element ensures that the right hand thrust piston 30 is tilted radially outwards, so long this is still possible in relation to its idle position. Thus, the spring element 31 acts as a means which fixes the thrust piston in its receiving position. From its initial position, as shown in FIG. 6, this can be ensured through slight lifting or slight tilting radially outwards.

Figure 8:
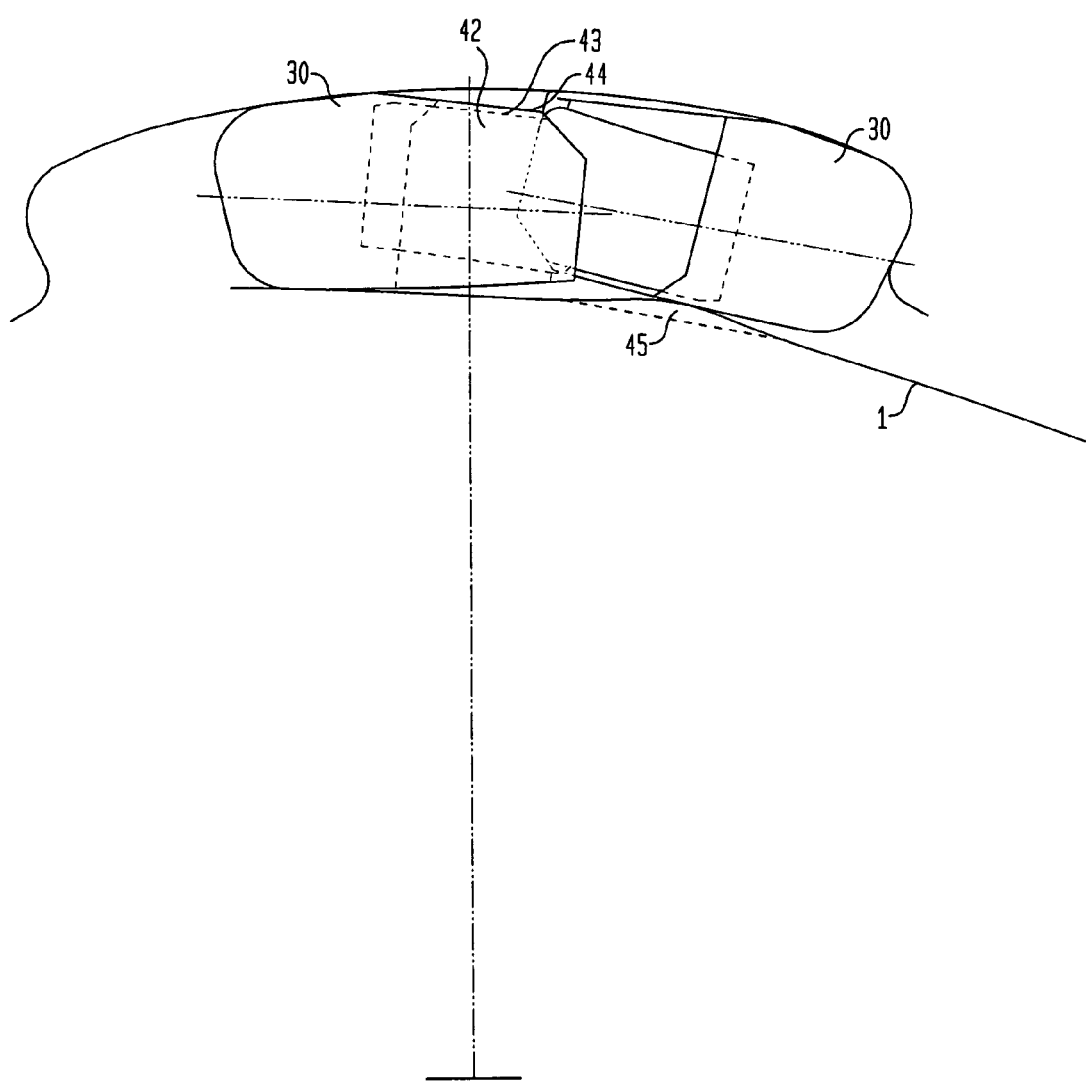
FIG. 8 shows the first thrust piston in FIG. 7 gradually moved along its guide toward the second thrust piston and slightly overlapping with the second thrust piston.

FIG. 8 shows the torsional vibration damper in its position immediately before the one thrust piston 30 engages in the other thrust piston 30. As clearly shown, the slanted ramp surface 43 of the left thrust piston 30 can engage, in this arrangement, underneath the external support surface 42 of the right thrust piston 30. Likewise, it is clearly shown that the left hand thrust piston 30 is forced in its engagement position by both rotational subassemblies 1, 2.

Figure 7:
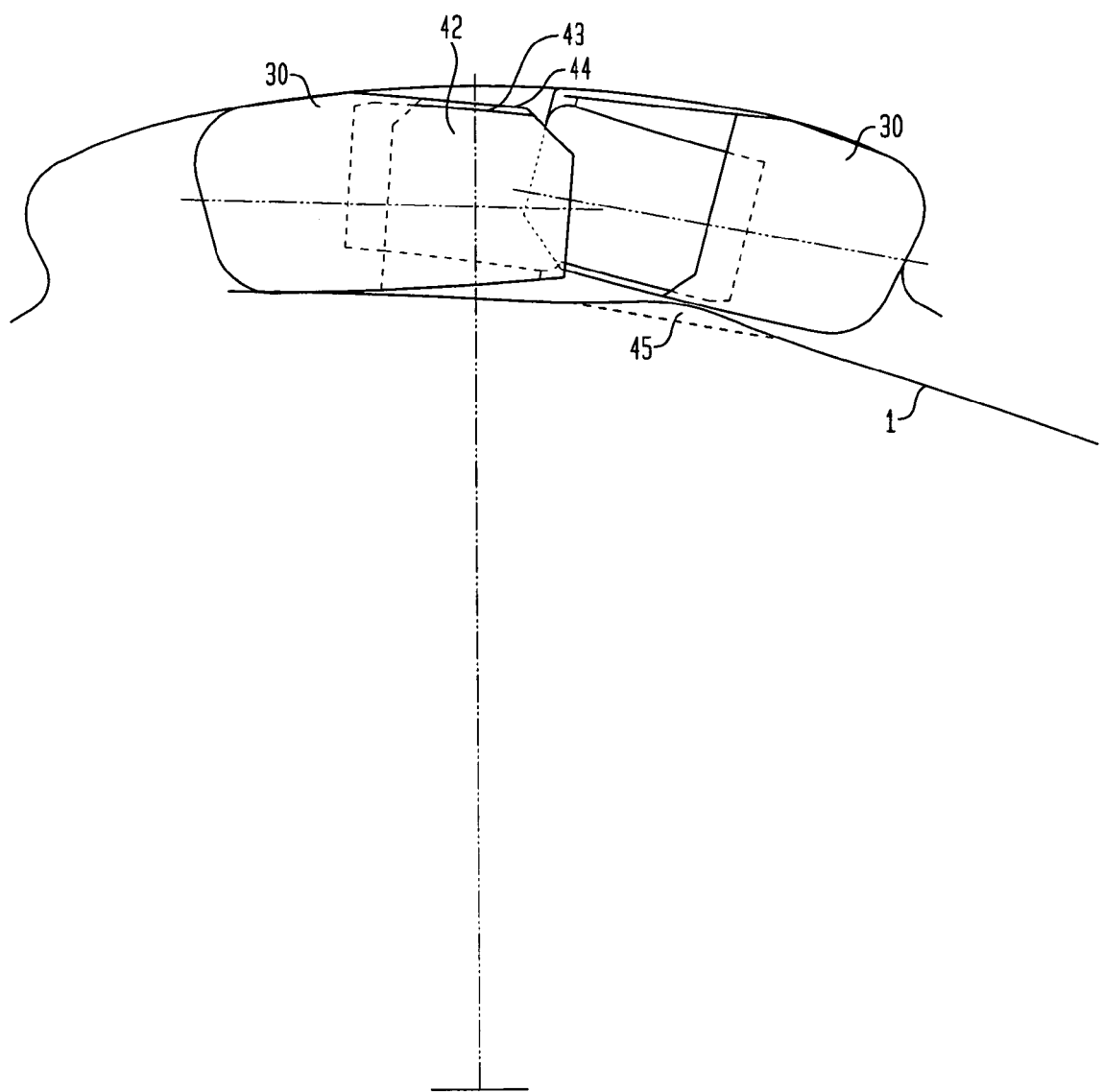
FIG. 7 is a schematic progression of one of the thrust pistons moving into a displacement position.

The spring element 31, is seen located between the two thrust pistons as shown in FIG. 1. As seen in FIGS. 7 and 8 (where only the thrust pistons are shown), the right hand thrust piston 30 displays a certain clearance. This clearance is between an impact area of the guide surface 44 at the subassembly 2 and an area where the thrust piston 30 impacts upon the projection 45. Thus, an unimpeded movement of the subassemblies relative to each other can be realized, while avoiding that the right piston 30 will leave its receiving position and avoiding an engagement into the left hand thrust piston.

Figure 9:
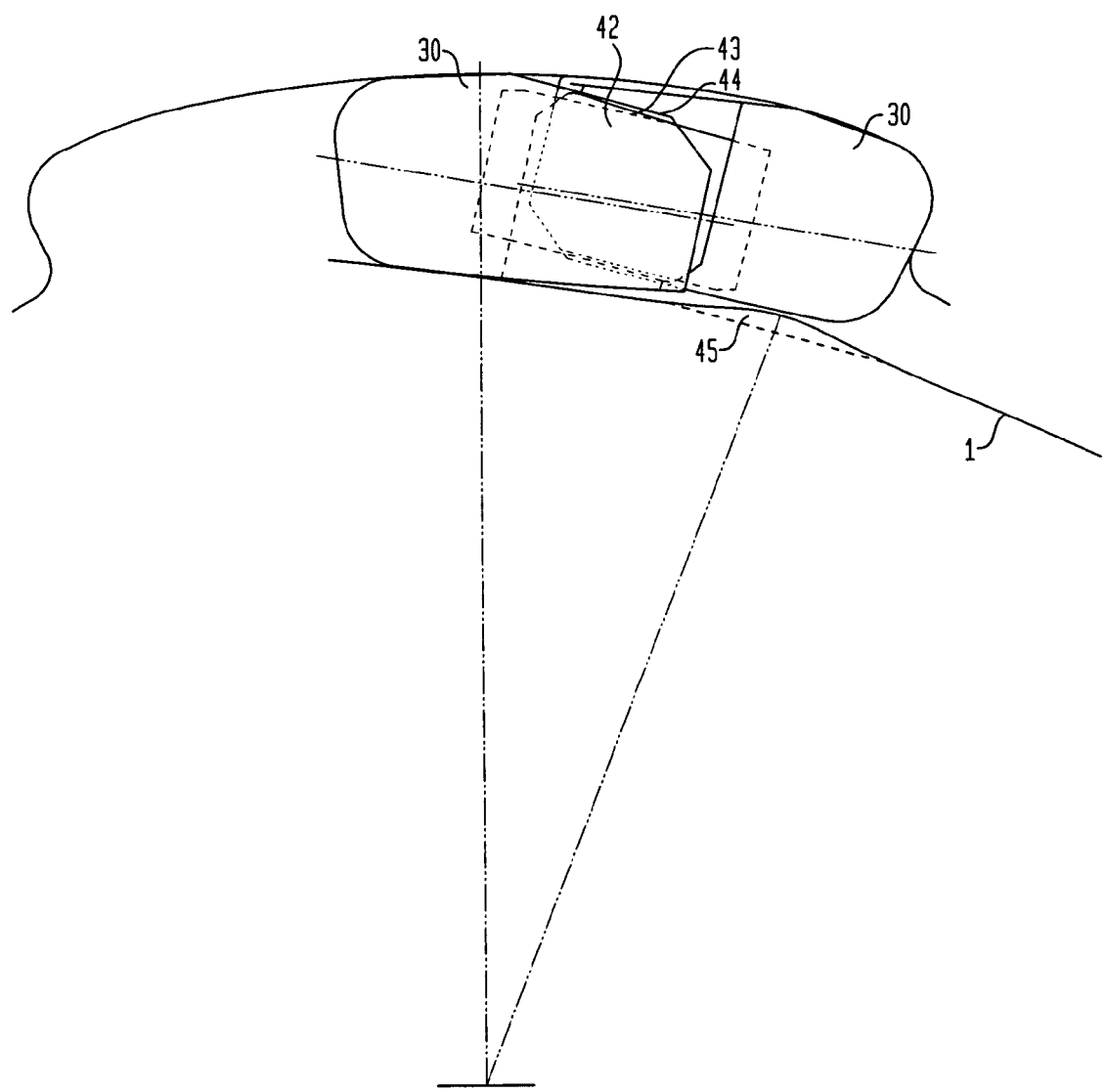
FIG. 9 shows the first thrust piston of FIG. 8 fully overlapping with the second thrust piston.

FIG. 9 shows both thrust pistons 30 during impact in a schematic way (without the spring). Due to their asymmetrical configuration a closer engagement with each other is realized, which means a greater compression of the spring element can be realized. This also permits a considerably greater relative rotational angle between the two subassemblies 1, 2 or, stated differently, a greater compression of the spring element 31 can take place at the same maximum rotational angle between the subassemblies. This is also particularly true for the radial external guidance as a consequence of the slanted ramp surface 43. Furthermore, the lateral guide surfaces 32 also ensure a considerably safer and more stable guiding of the thrust pistons 30. This arrangement avoids an impact of the spring elements 31 against the second subassembly 2, especially at high rotational speeds.

What is claimed is:

1. A torsional vibration damper comprising:
    a first subassembly and a second subassembly rotatably moving relative to one another; and
    at least one coupling element including an essentially tangentially effective elastic element for interconnecting the first and second subassemblies, and at least one thrust piston connected to the elastic element,
    wherein during a first phase in which the first and second subassemblies rotate relative to one another about a predetermined angle of rotation, the thrust piston moves slower than said first subassembly and is moved faster than said first subassembly during a second phase when the rotation of the first and second subassemblies exceeds the predetermined angle of rotation, whereby the thrust piston applies upon the first subassembly in opposition to the rotation thereof a restoring force which increases with increase in the relative rotation of the first and second subassemblies above the predetermined angle of rotation.

2. A torsional vibration damper according to claim 1, wherein during the second phase the movement of said first subassembly leads to a translation into a movement of said thrust piston in correspondence to the relative angle of rotation.

3. A torsional vibration damper according to claim 1, wherein the two subassemblies rotatably moving relative to one another around a common axis at increasing angles of rotation so that the relative rotation leads the thrust piston to be moved relative to said first subassembly around said common axis, whereby said thrust piston moves slower around said common axis than said first subassembly moves around said common axis at relative angles of rotation of less than 12° between said two subassemblies.

4. A torsional vibration damper according to claim 1, wherein said coupling element further comprises a second thrust piston in such a manner so that one thrust piston is located on each side of said elastic element and wherein the displacement of the first thrust piston leads the first thrust piston initially into a tilting motion relative to said first subassembly and relative to the second thrust piston.

5. A torsional vibration damper according to claim 1, wherein the thrust piston is displaced relative to said first subassembly by means of a guide surface of the first subassembly and by means of a guide surface of the second subassembly.

6. A torsional vibration damper according to claim 5, wherein the displacement of the thrust piston includes a sliding movement of said first subassembly underneath said thrust piston on said guide surface upon relative movement of said two subassemblies at least at a certain relative angle between said two subassemblies, while said thrust piston is acting onto said guide surface with the restoring force.

7. The torsional vibration damper according to claim 1, wherein said thrust piston being guided along mutual guide surfaces relative to said first and second subassemblies, so that in the first phase the thrust piston bears upon the second subassembly and in the second phase is radially tilted relative to its first position.

8. The torsional rotation damper of claim 1, wherein the coupling element includes two thrust pistons, which are each provided with a recess for mutual engagement with one another at a particular relative angle between the two subassemblies.

9. The torsional vibration damper of claim 8, wherein the elastic element is a spring element, said thrust pistons each having a lateral support surface for a spring element disposed between the thrust pistons.

10. The torsional vibration damper according to claim 9, wherein said two thrust pistons each have an axial external region formed with a slanted ramp surface.

11. The torsional vibration damper according to claim 10, wherein each piston is provided with a guide surface axially adjacent to the slanted ramp surface for contact upon one of the subassemblies.

12. The torsional vibration damper according to claim 8, wherein the thrust pistons are configured asymmetrical in relation to a radial plane of the torsional vibration damper.

13. The torsional vibration damper according to claim 1, wherein the coupling element includes at least two thrust pistons; wherein each thrust piston has a receiving position and an engagement position in relation to one of the two rotational subassemblies.

14. The torsional vibration damper according to claim 13, wherein one the thrust pistons is tilted radially inwards in its engagement position in relation to the other thrust piston.

15. The torsional vibration damper according to claim 13, wherein the elastic element acts as means for securing one of the two thrust pistons in its receiving position, when the other one of the two thrust pistons occupies its engagement position.

16. The torsional vibration damper according to claim 1, wherein the coupling element essentially includes two identical thrust pistons positioned in opposite disposition.

17. The torsional vibration damper according to claim 1, wherein the elastic element is a spring element.

18. The torsional vibration damper of claim 1, wherein during the first phase the thrust piston bears upon a guide surface of the second subassembly and in the second phase, the thrust piston moves into a tilted position relative to the first subassembly while the rotational movement of the first subassembly is translated into a movement of the piston in dependence on the size of the relative rotational angle between the two subassemblies.

* * * * *